H. O. FLETCHER.
SEARCHLIGHT APPARATUS.
APPLICATION FILED JULY 7, 1919.
1,364,267.
Patented Jan. 4, 1921.
2 SHEETS—SHEET 1.
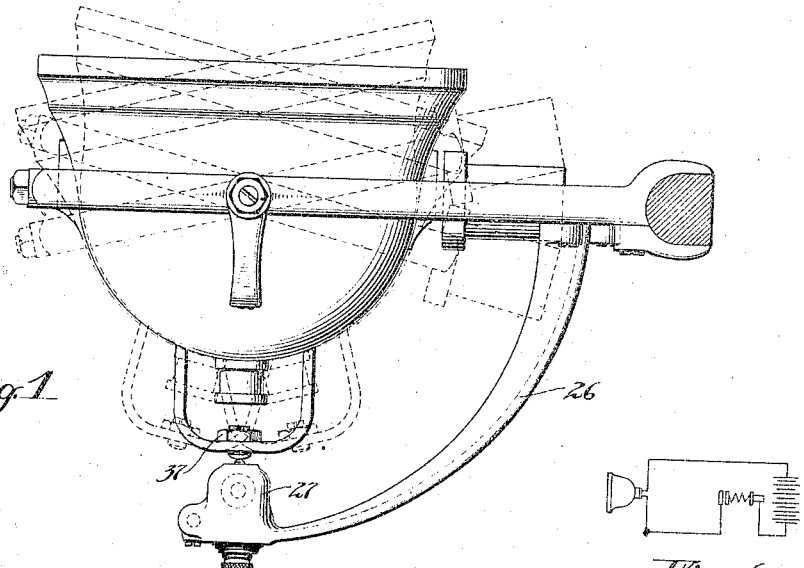
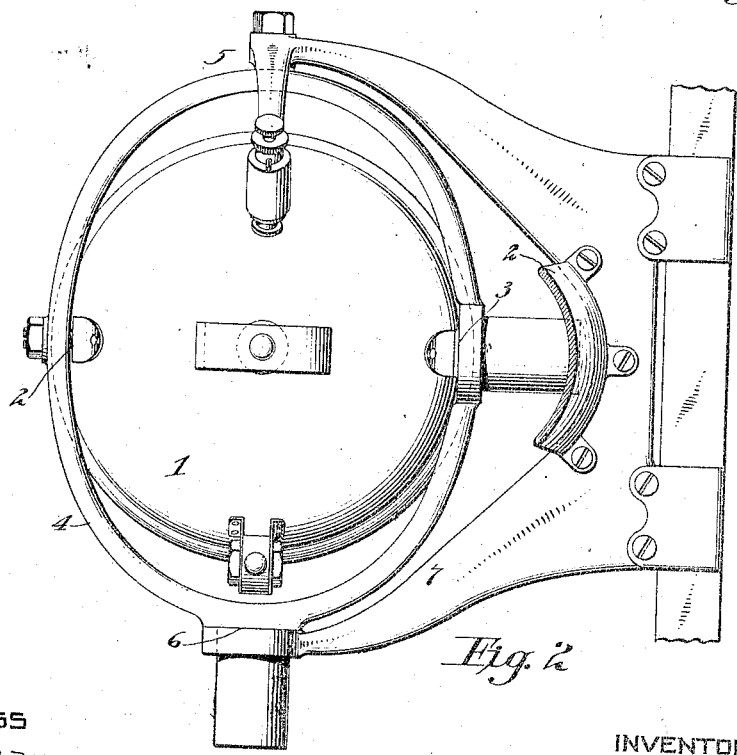

UNITED STATES PATENT OFFICE.

HENRY O. FLETCHER, OF BRIDGEPORT, CONNECTICUT.

SEARCHLIGHT APPARATUS.

1,364,267.  Specification of Letters Patent.  Patented Jan. 4, 1921.

Application filed July 7, 1919. Serial No. 309,003.

*To all whom it may concern:*

Be it known that I, HENRY O. FLETCHER, a citizen of the United States, residing at Bridgeport, county of Fairfield, and State of Connecticut, have invented new and useful Searchlight Apparatus, of which the following is a specification.

This invention relates to search lights and means for manipulating the same, and while not restricted to such use, is more particularly designed for search lights such as are used on vehicles.

It provides a light which may be conveniently manipulated by the operator to minimize the attention necessary therefor, so as to distract the attention of the driver of the automobile or other vehicle from his usual duties as little as possible.

It seeks also to minimize the time during which the light may be lighted by causing it to be extinguished at all times when it is not needed, resulting in marked economy in operation and in the smallest amount of annoyance to other motorists within its range.

It further provides a mechanism of the kind which shall be automatic in its action so that the mere training of the light in any direction desired serves to light the same, while on its release by the operator it is returned automatically to a normal central position and extinguished.

It provides further, improved mechanism for insuring this automatic action making necessary the use of but a single switch in the lighting circuit of the lamp and which functions properly when the lamp is trained in any direction desired.

Provision is also made whereby the automatic centering means may be rendered inoperative and the lamp held trained in any desired direction and lighted without further attention on the part of the operator as long as desired.

Other objects and advantages, combinations and details of construction will appear from a description of one embodiment of the invention shown in the accompanying drawings in which—

Figure 1 is a plan view of the lamp and its mountings;

Fig. 2 is a rear elevation, certain parts being broken away;

Fig. 6 is a diagram of the electric circuits; and

Figure 3:
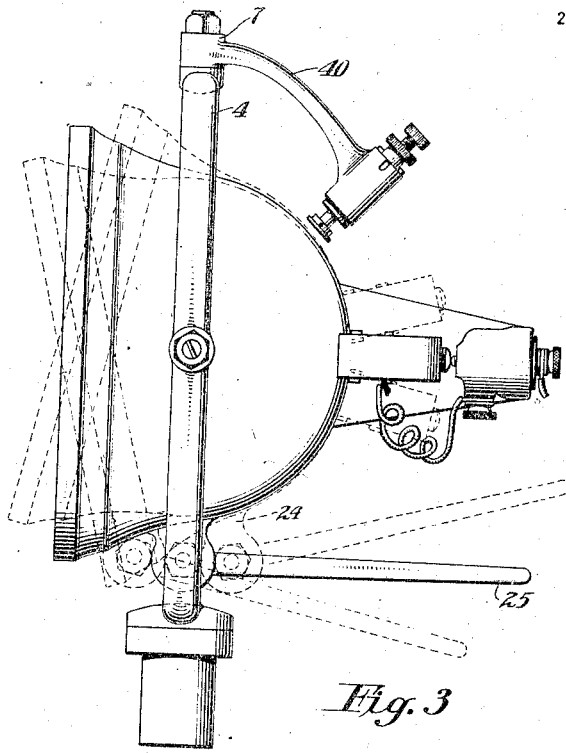
Fig. 3 is a side elevation.

1 represents a search light preferably of a construction usual for vehicular use. This lamp is carried on an axis formed by the pivots 2 and 3 within a frame member 4, which is pivoted in turn on an axis arranged substantially at right angles to the lamp axis, passing through the pivots 5 and 6, and carried by the bracket 7, which is designed to be attached to any convenient support such as a windshield. The lamp is therefore mounted for universal turning movement. Pivots 2 and 5 are each composed of a suitable pin carried by the ring 4 and bracket 7 respectively and journaled within suitable openings in lamp 1 and ring 4 respectively.

Figure 5:
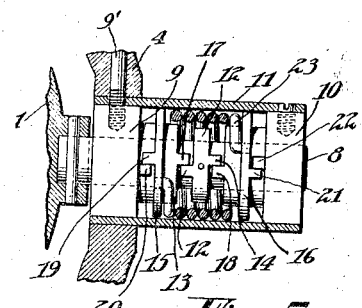
Fig. 5 is a section view of a centering device.
Figure 7:
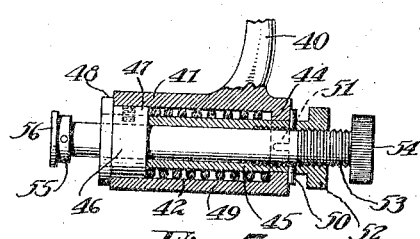
Fig. 7 is a sectional view of the brake or stop.

Pivot 3 is shown in cross section in Fig. 5 and consists of a pintle pin 8 carried by the lamp 1 and journaled within suitable bearings 9 and 10 spaced apart within a sleeve 11, bearings 9 and 10 and sleeve 11 being fixed within an opening in frame 4 by any suitable means such as screw 9'. Midway between bearings 9 and 10 a collar 12 fast to pintle 8 is provided with outstanding abutment lugs 13 and 14 on opposite lateral faces. On either side of collar 12 are collars 15 and 16 loosely mounted on pintle 8 and provided with lugs 17 and 18 adapted to be engaged by the respective lugs 13 and 14 on rotation in opposite directions of pintle 8. Collar 15 is also provided on its opposite lateral face with an abutment 19 adapted to contact with an abutment 20 fast on bearing 9, while collar 16 has a similar abutment 21 adapted to engage an abutment 22 fast on bearing 10. A torsion coil spring 23 is carried within the sleeve 11 and its opposite ends are engaged within openings in collars 15 and 16 so that the lugs 19 and 21 of collars 15 and 16 are urged in opposite directions into contact with the abutments 20 and 21 respectively. It should be noted that the lugs 13 and 14 of collar 12 are so related to lugs 17 and 18 of collars 15 and 16 that rotation of the pintle pin 8 in a direction to cause pressure to be applied against one or the other will serve to separate the lug on collar so moved from the lug on its adjacent bearing, against the action of spring 23. Pivot 6 is of substantially the same construction as pivot 3 with the exception that the bearing members for pivot 6 are ring 4 and bracket 7 instead of the lamp and ring 4 and it will not, therefore, be further described in detail.

Fixed on the casing of lamp 1 at any convenient point is a bracket 24 carrying an arm 25 by which the operator may swing the lamp in any direction about either or both of its axes.

Figure 4:
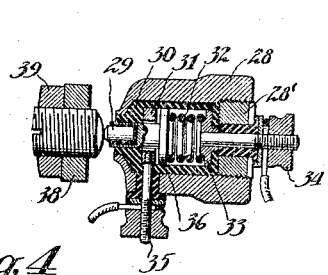
Fig. 4 is a section through the switch mechanism.

Projecting from bracket 7 is an arm carrying at its outward extremity a switch device 27 shown in cross section in Fig. 4. As shown this switch device comprises a casing 28 having a bushing of insulation 30 therein. A metal contact ring 31 is seated within this bushing, and slidable therethrough but out of contact therewith is a plunger 29 slidably mounted in an opening in bushing 30. Plunger 29 carries at its inner end a metal disk 36 which is normally urged into contact with ring 31 by means of a coil spring 32 seated within the bushing 30 and bearing at its outer end on a metal disk 33 in electrical connection through a suitable insulated plug 28' with a binding post 34. A second binding post 35 is in electrical connection through the side wall of casing 28 with contact ring 31. On the rear of the lamp casing is a bracket 37 carrying an adjustable screw abutment 38 adapted to be locked in adjusted position by means of lock-nut 39. Abutment 38 is arranged to contact and depress plunger 29 when the lamp is trained directly away from the switch but on turning the lamp in any direction about either or both axes abutment 38 is removed from such contact.

Also carried by bracket 7 is an arm 40 projecting rearwardly toward the switch casing 28 and provided at its extremity with a sleeve 41 having an enlarged bore 42 extending from the inner end thereof and terminating at its other end in a smaller bore 43 forming an annular shoulder 44. A sleeve 45 finds slidable bearing within the bore 43 and adjacent the inner end of sleeve 41 has fast thereon a collar 46 having a reduced portion 47 projecting within the bore 42 and a flange 48 normally against the end of sleeve 41. A coil spring 49 within sleeve 41 bears at one end against abutment 44 and at the other against collar 46 and serves to urge the latter away from the end of sleeve 41. External to sleeve 41 sleeve 45 is provided with pins 50 transverse thereof and sleeve 41 is provided with slots, one of which is shown, at 51 within which pin 50 may be seated when sleeve 45 is turned in a position to register pin 50 therewith. Sleeve 45 may be provided with a head 52 by which it may be rotated. Passing through sleeve 45 and screw threaded therein is an adjustable rod 53 having a head 54 by which it may be turned to adjust it longitudinally of sleeve 45. At its inner end rod 53 has fixed thereto a shoe 55 the outer face of which may be provided if desired with any suitable friction material 56 such as felt.

The operation of the device is as follows:

As shown in Fig. 6 current from a source of supply passes to the binding post 34, through the switch, and from binding post 35 through the lamp filament and back to the source of supply. With the lamp in position shown in full lines in Figs. 1 and 3, abutment screw 38 is in contact with plunger 29 holding the same retracted so that disk 36 is out of electrical contact with ring 31. The circuit is therefore broken and the light is extinguished. Should the operator wish to use the light, he grasps the handle 25 and trains the lamp on the object desired in whatever direction it may be. As shown in dotted line in Figs. 1 and 3, this removes abutment 38 from the plunger 29 which is immediately urged into electrical contact with ring 31 by means of the spring 32, completing the electrical circuit through the switch by means of binding post 34, disk 33, spring 32, disk 36, ring 31, and binding post 35, whereupon the lamp is immediately lighted. In training the lamp as described, should the operator swing the lamp about the axis of the pintle pin 8, disk 12 is turned in the corresponding direction, engaging by means of one of its lugs 13 or 14 with the corresponding collars 15 or 16, and rotating the same against the action of spring 23. On release of the lamp by the operator spring 23 therefore returns the lamp to its former position. A similar action takes place if the operator turns the lamp about the axis of the pivots 5 and 6. It is therefore seen that in whatever direction the lamp may be turned from its normal position, on being released by the operator it will immediately return thereto, and when in such position the lighting circuit will be broken by the switch to extinguish the lamp and that in any other position the lamp will be lighted.

It is sometimes desirable to hold the lamp trained in some particular direction without requiring the operator to retain it in such position or to maintain it lighted. For this purpose the brake mechanism carried by arm 40 has been provided. The shoe 55 may be brought into position to engage the spherical surface of the lamp casing, or a plate having a spherical surface fast thereto if the casing is not so shaped, by turning the sleeve 45 by means of the head 52, to bring the pin 50 in registry with the slots 51, whereupon spring 49 projects sleeve 45 toward the lamp casing carrying shoe 55 on rod 53 therewith, to hold the lamp frictionally in position against the action of the centering springs. The degree of pressure exerted against the lamp casing by shoe 55 may be adjusted by turning rod 53 to move it lengthwise within sleeve 45 by means of its threaded engagement therewith. It may be adjusted to merely overcome the action of the centering springs, or if desired, may be so adjusted as to lock the lamp from turning or being turned, by positive screw pressure.

Having thus described one embodiment of my invention though it is apparent that many changes might be made therein without departing from the spirit and scope thereof, what I claim as new and desire to secure by Letters Patent of the United States is:

1. In an apparatus of the class described, a lamp, means to support said lamp to allow of universal movement thereof, means tending to hold said lamp in a determined position and to automatically return said lamp to said position when removed therefrom in any direction, means for moving said lamp out of said position in any direction, a lamp circuit, and a single switch mechanism in said circuit arranged to open said circuit when said lamp is in said position and to close said circuit when said lamp is out of said position.

2. In an apparatus of the class described, a universally mounted lamp, a lighting circuit therefor, a switch controlling said circuit, and means acting on the turning of said lamp in any direction from a definite position for actuating said switch.

3. In an apparatus of the class described, a lamp mounted to swing about two non-parallel axes, a lighting circuit for said lamp, a switch for said circuit, means to normally hold said lamp in a definite position about each axis and to return said lamp to such position when removed therefrom, means to turn said lamp at will from said position in any direction, means whereby said switch is closed when said lamp is turned in any direction from said position, and means to open said switch when said lamp is returned to such position.

4. In an apparatus of the class described, a lamp mounted to turn about two non-parallel axes, a lighting circuit for said lamp, a normally closed switch in said circuit, and means operative only when said lamp is in a definite position about both axes for maintaining said switch open.

5. In an apparatus of the class described, a lamp mounted to turn about two non-parallel axes, a lighting circuit for said lamp, a normally closed switch in said circuit mounted adjacent said lamp, and a member carried by said lamp and arranged to contact said switch to maintain said switch open when said lamp is in a single definite position about both axes.

6. In an apparatus of the class described, a projection lamp mounted to swing about two axes arranged substantially at right angles to each other, a lighting circuit for said lamp, a normally closed switch for said circuit fixed adjacent said lamp, an abutment carried on the rear of said lamp and arranged to contact with said switch to retain the same open when said lamp is at a definite position about each axis and to be out of contact with said switch when said lamp is out of such position about either or both of said axes, and means for normally holding said lamp in position with said abutment in switch-contacting position.

7. In an apparatus of the class described, a lamp mounted to turn about two non-parallel axes, returning means for normally holding said lamp at a definite position about each axis, and common means for rendering said returning means ineffective to return said lamp about both axes.

8. In an apparatus of the class described, a lamp mounted to turn about two non-parallel axes, means for normally holding said lamp at a definite position about each axis and returning said lamp to such position when removed therefrom, and a brake arranged at will to prevent such returning.

9. In an apparatus of the class described, a lamp mounted to turn about two non-parallel axes, means for normally holding said lamp at a definite position about each axis and returning said lamp to such position when removed therefrom, a brake shoe arranged to be pressed into contact with the casing of said lamp, and means to adjust the pressure of said shoe.

10. In an apparatus of the class described, a lamp mounted to swing about an axis, means normally holding said lamp at a definite position about said axis and tending to return said lamp to such position when removed therefrom, and a brake member adjustable to prevent swinging of said lamp, said brake member being adjustable to act with either resilient or positive pressure.

HENRY O. FLETCHER.

Witnessed by—
J. W. SCHEFFER,
MAUDE B. GOULD.